US012499325B2

(12) United States Patent
Mei et al.

(10) Patent No.: US 12,499,325 B2
(45) Date of Patent: Dec. 16, 2025

(54) SYSTEMS AND METHODS FOR OPTIMIZING DATA LABELING USING ENTROPY SCORES

(71) Applicant: Capital One Services, LLC, McLean, VA (US)

(72) Inventors: Gang Mei, Ellicott City, MD (US); Zhuqing Zhang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 396 days.

(21) Appl. No.: 18/158,092

(22) Filed: Jan. 23, 2023

(65) Prior Publication Data
US 2024/0249083 A1 Jul. 25, 2024

(51) Int. Cl.
*G06F 40/44* (2020.01)
*G06F 40/30* (2020.01)

(52) U.S. Cl.
CPC .............. *G06F 40/44* (2020.01); *G06F 40/30* (2020.01)

(58) Field of Classification Search
CPC .................................. G06F 40/44; G06F 40/30
See application file for complete search history.

(56) References Cited

U.S. PATENT DOCUMENTS

| 2020/0334095 | A1* | 10/2020 | Xu | G06F 11/076 |
| 2021/0042471 | A1* | 2/2021 | Ponomarev | G06F 40/30 |
| 2022/0157468 | A1* | 5/2022 | Li | G06F 18/2451 |
| 2022/0414137 | A1* | 12/2022 | Sewak | G06F 16/3346 |

OTHER PUBLICATIONS

National Institute of Standards and Technology (NIST) Dataplot, electronically accessed from https://www.itl.nist.gov/div898/software/dataplot/refman2/auxillar/cosdist.htm) on Apr. 16, 2025 (Year: 2017).*

* cited by examiner

*Primary Examiner* — Bhavesh M Mehta
*Assistant Examiner* — Joseph J. Yamamoto
(74) *Attorney, Agent, or Firm* — Foley & Lardner LLP

(57) ABSTRACT

Systems and methods for improving training efficiency while reducing total labeling cost for downstream modeling using entropy scores for labeling predictions. The system may receive a first text string, process the first text string in an artificial intelligence model, and determine: a first likelihood that the first text string has a first label component; a second likelihood that the first text string has a second label component; a composite likelihood for the first text string based on the first likelihood and the second likelihood; and a first entropy score from the composite likelihood. It may compare the first entropy score to a first threshold entropy score and generate a recommendation to review a first label being assigned to the first text string.

20 Claims, 6 Drawing Sheets

SYSTEMS AND METHODS FOR OPTIMIZING DATA LABELING USING ENTROPY SCORES

BACKGROUND

In recent years, the use of artificial intelligence—including, but not limited to, machine learning, deep learning, etc. (referred to collectively herein as functions, neural networks, artificial intelligence models, machine learning models, or simply models)—has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations.

SUMMARY

One goal of artificial intelligence is to enable smart machines to make decisions that typically require human intelligence. One way artificially intelligent systems can achieve this goal is by estimating a best-fit function, or model, which represents the relationship between features in a dataset and their corresponding labels. The features can be the input to the function or model, analogous or equivalent to the information a human might use to make the decision being modeled, and can include categories, continuous measurements, other descriptive information, etc. The labels, on the other hand, can include unsupervised classifications, human annotations, probability distributions, etc., which can be the output from the function or model, and can be analogous or equivalent to the decision itself which the human might make given the particular set of input features. This function can be defined by a variety of mathematical methods (e.g., logistic regression. Markov Chain Monte Carlo. Bayesian Estimation. Stochastic Gradient Descent, etc.), as applied to a dataset.

Despite the wide-ranging potential applications and their related benefits, implementations of artificial intelligence have been hindered by several technical problems. Namely, artificial intelligence often relies on large amounts of labeled data. Such labeled data are scarce, of variable quality, and the process for obtaining it is complex and time-consuming (especially when considering that practical implementations of artificial intelligence require specialized knowledge to design, program, and integrate artificial intelligence-based solutions, which creates a bottleneck in the number of specialists and resources available to create these practical implementations).

Embodiments of the present disclosure solve those challenges and others by providing systems and methods for propagating labels through a sparsely labeled dataset using a supervised projection of a semantic embedding, improving label quality in datasets using a quality filter based on a consistency score, and improving training efficiency while reducing total labeling cost for downstream modeling using entropy scores for labeling predictions.

For example, the supervised projection of the semantic embedding solves the technical problem of label scarcity in large datasets by creating a space whose dimensions are optimized for a label propagation task. Solving this technical problem provides the practical benefit of programmatic annotation of large datasets by propagating from small labeled datasets.

In some aspects, the system may receive a dataset and a labeling task. The labeling task can include pre-collected labeled data (e.g., ground truth data labeled by humans with high accuracy). The system may determine a semantic graph by embedding the dataset using a language model. The language model can be a contrastive learning language model. The system may process the semantic graph in an artificial intelligence model to generate a first output, wherein the artificial intelligence model is trained to output optimal sets of dimensions for labeling tasks based on inputted semantic graphs. Based on the first output, the system may determine an optimal set of dimensions for the labeling task. The system may build a projector based on the pre-collected labeled data, which can then project the semantic graph into the optimal set of dimensions to form a projected graph. The system may determine a first distance between the first projection and a second projection in the projected graph, wherein the second projection has a second label. The system may determine a first likelihood the first projection has a first label. The system may determine a second likelihood the first projection has the second label based in part on the first distance to the second projection. The system may compare the first likelihood to the second likelihood. In response to comparing the first likelihood to the second likelihood, the system may generate for display, on a user interface, a first recommendation to stop the labeling task. Furthermore, the system can generate for display the projected graph as well as the semantic graph, evaluating which graph better embeds the likelihood that text may have similar semantic information to other text.

In another example, the system can solve the technical problem of evaluating the quality of data labeling in a model agnostic manner by providing a consistency score. The consistency score can provide the practical benefit by assuring that labels meet specified requirements.

In some aspects, the system may receive a first given label for a first text string. The system may process the first text string in an artificial intelligence model, wherein the artificial intelligence model is trained to output predicted labels given inputted text strings. The system may determine a first predicted label for the first text string. The system may determine a first consistency score for the first text string based on a comparison of the first predicted label and the first given label, wherein the first consistency score indicates a degree of consensus between the first predicted label and the first given label. The system may compare the first consistency score to a first threshold consistency score. In response to comparing the first consistency score to the first threshold consistency score, the system may filter the first text string to a first group. The system may generate for display, on a user interface, a recommendation to use the first group as a training sample for a supervised learning task.

In a third example, the system can solve the technical problem of improving training efficiency while reducing total labeling cost for downstream modeling by using entropy scores. Entropy scores can enable the system to sample those datapoints that would be the most informative for training a model to output the correct label for a given text string. Solving this technical problem provides the practical benefit of restricting label determinations to a data sample that would provide the greatest boost to the model's performance, while requiring less time and fewer resources.

In some aspects, the system may receive a first text string. The system may process the first text string in an artificial intelligence model, wherein the artificial intelligence model is trained to output likelihoods that inputted text strings correspond to predetermined labels. The system may determine a first likelihood that the first text string has a first label component. The system may determine a second likelihood that the first text string has a second label component. The system may determine a composite likelihood for the first text string based on the first likelihood and the second likelihood. The system may determine a first entropy score from the composite likelihood, wherein the first entropy score indicates uncertainty of label components in the composite likelihood. The system may compare the first entropy score to a first threshold entropy score. In response to comparing the first entropy score to the first threshold entropy score, the system may generate for display, on a user interface, a recommendation to review a first label being assigned to the first text string.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
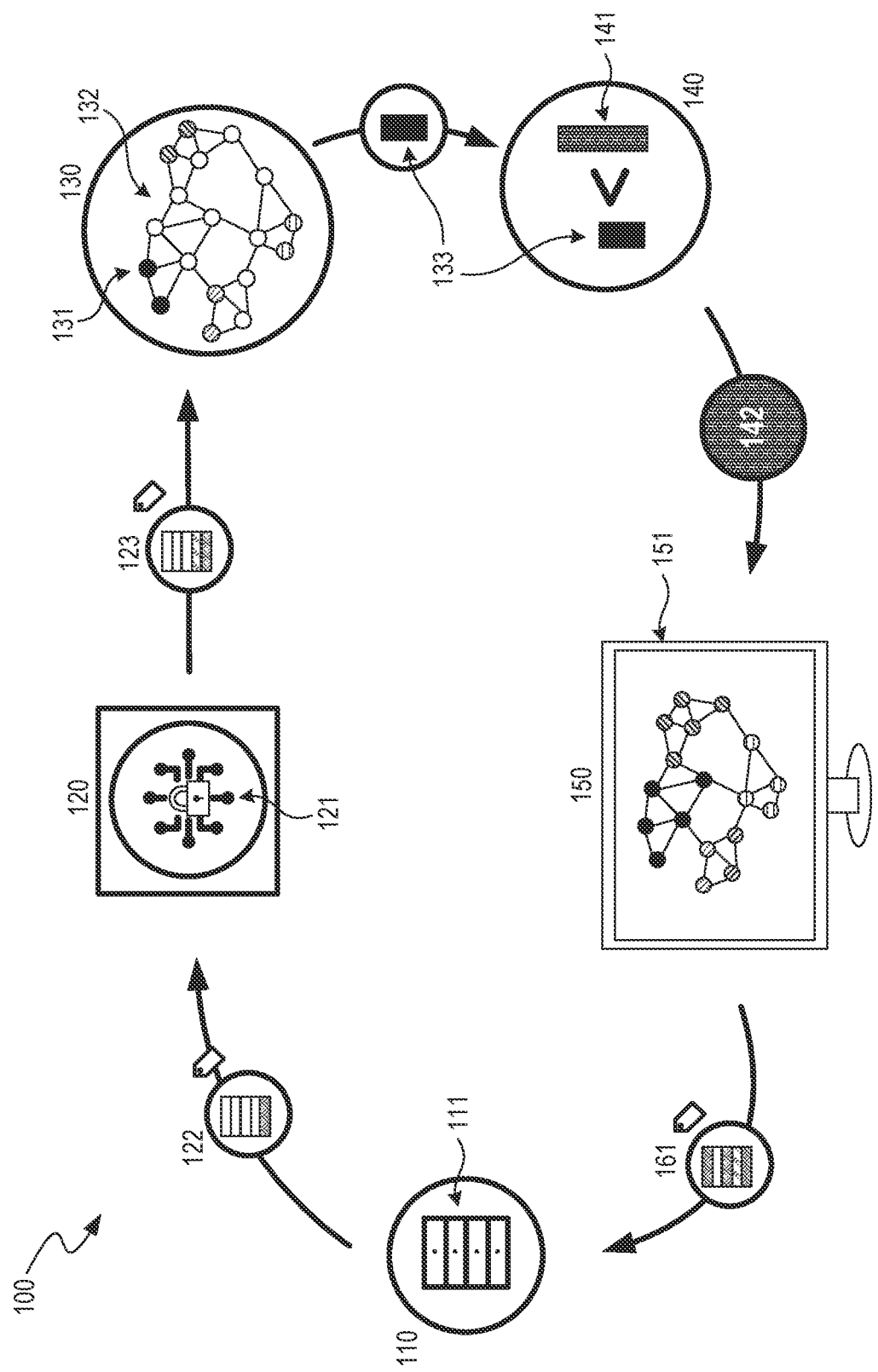
FIG. 1 shows an illustrative diagram demonstrating a method for propagating and filtering labels in a dataset while improving training efficiency, in accordance with one or more embodiments.

FIG. 1 shows an illustrative diagram demonstrating a method 100 for propagating labels through a sparsely labeled dataset using a projection of an embedding, in accordance with one or more embodiments. In other embodiments, the method 100 can improve label quality in datasets using a quality filter based on a consistency score. Alternatively, or additionally, the method 100 may improve training efficiency while reducing total labeling cost for downstream modeling using entropy scores for labeling predictions. For example, the method 100 can be viewed as a series of steps, or operations, each of which can be performed by a specific service (e.g., a software application), or multiple services, with each service running on the same device, its own device, or multiple devices, with their activity coordinated by separate applications, and the overall coordination of steps or services in the method 100 being referred to as an architecture.

The method 100 can begin with a receiving step 110 in which a message 111 is received. As referred to herein, the message 111 may include a dataset, a labeling task, a first given label for a first text string, a first text string, or any information that could be used for propagating labels in a dataset, filtering datapoints based on the quality of their associated labels, or measuring the degree of uncertainty or distance from the mean for datapoints regarding their labels. The labeling task can include pre-collected labeled data (e.g., ground truth data labeled by humans with high accuracy). In some embodiments, the message 111 may comprise a dataset, a "dataset" comprising a collection of data. "data" being information that has been translated into a form that is efficient for movement or processing. In some embodiments, the data may comprise an electronically interpretable data. In some embodiments, the dataset may comprise of data from multiple sources. The data may comprise any content. As referred to herein, "content" should be understood to mean an electronically consumable user asset, such as Internet content (e.g., streaming content, downloadable content. Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user. In some embodiments, the message 111 may include a labeling task. As referred to herein, a labeling task can include a process for identifying raw information and adding one or more meaningful and informative labels to provide context so that a machine learning model can learn from it. In some embodiments, the labeling task may comprise labeling training data for a machine learning model. In some embodiments, the labeling task may comprise archiving the labels into a search format. It should be noted that the label may comprise any type of content. In some embodiments, the message 111 may include a label (including a first, second, and third label, as well a predicted label and a given label, also a first label component and a second label component). In some embodiments, the label includes an output from a model, which can be predicted or received by the method 100.

In alternate embodiments, the receiving step 110 can additionally include preprocessing. As referred to herein, preprocessing the message 111 can include transforming, editing, manipulating, or otherwise altering the message 111 prior to a processing step 120. By preprocessing, the method 100 can boost performance of a model which uses the preprocessed message as input. In some embodiments in which the message 111 comprises a dataset, preprocessing can include embedding the dataset as a semantic graph through the use of a language model (e.g., BERT, XLNet, GPT2, derivatives or combinations of the foregoing language models, other language models, etc.). The language model can be a contrastive learning language model. As referred to herein, a semantic graph can include a numeric representation or plotting of text data as datapoints with coordinates, in which a datapoint's coordinates are dependent on the meaning of the corresponding text. In some embodiments, the semantic graph can include a graph embedding in which the semantic content of text has been transformed to a set of vectors, "semantic content" including the meaning of the text as opposed to its structure or form.

The method 100 can subsequently include a processing step 120 in which the message 111 is processed in an artificial intelligence model 121. As referred to herein, the artificial intelligence model can include a supervised model or an unsupervised model. In some embodiments, the artificial intelligence model 121 can include a neural network, a statistical distribution, a mathematical function, or an ensemble method that comprises the foregoing networks, distributions, and/or functions, along with other data science or machine learning methods, in which the artificial intelligence model 121 can be trained to approximate a relationship between a range of inputs 122 and a range of outputs 123.

As referred to herein, the range of inputs can include data of similar formats and types as the message 111 (e.g., a dataset, a semantic graph, or a text string, etc.), and the range of possible outputs can include an optimal set of dimensions for a labeling task based on an inputted semantic graph, a predicted label given an inputted text string, or a likelihood that an inputted text string corresponds to a predetermined label, etc. In some embodiments, the artificial intelligence model can be trained on data that does not overlap or include the message 111. In some embodiments, training can involve feed-forward and back-propagation through a neural network, and/or optimization algorithms (e.g., stochastic gradient descent, Limited Memory Broyden Fletcher Goldfarb Shanno, simulated annealing optimization, evolutionary algorithm optimization, particle swarm optimization, etc.). In some embodiments, rather than training the model 121, a series of weights can be transferred to the model 121 from a separate pre-trained model, wherein the weights map a relationship between inputs and outputs of equivalent type and format.

Next, the method can include a determining step 130 in which the range of outputs 123 is used to determine a label 131 for the message 111. As referred to herein, the label can include a hard label, a set of dimensions, a probability distribution, a likelihood, etc. In some embodiments, the label 131 can include a likelihood (including a first and a second likelihood), a likelihood which can include a probability associated with an output generated by a model. For example, a likelihood may comprise any quantitative or qualitative description of a probability. In some embodiments, the determining step 130 can further comprise a propagation step 132, which can include decomposing, transforming, or otherwise using the label 131 as an input to produce a propagation metric 133. As referred to herein, the propagation metric 133 can be a measure of distance, of consistency, of entropy, etc. In some embodiments, the propagation metric 133 can include an entropy (including a first, second, and an average entropy score), which can include a measure of uncertainty inherent to a variable's possible outcomes. In some embodiments, the propagation metric 133 can include a first consistency score, which can include a measure of the agreement between two labels. In some embodiments, the propagation metric 133 can include an outlier score (including a first and second outlier score), which can include a measure of the distance between a datapoint and a measure of center of a dataset which comprises the datapoint. In some embodiments, the propagation metric 133 can include a distance (including a first and a second distance), which can include a measure of similarity between projections in a projected graph. The projected graph can include a projection of the semantic graph. "projection" being an operation by which the dimensionality of the original semantic graph is flattened—or reduced—such that the graph becomes more interpretable; that is, the separation between different categories or classes (e.g., labels) becomes greater and more distinct. Projections (including first and second projections) can include those embeddings from the semantic graph which have been projected into the new flattened projected graph. In some embodiments.

Following its determination, the propagation metric 133 can be used in a comparison step 140, where it can be compared against a threshold score 141. As referred to herein, a threshold score 141 can include a score, either qualitative or quantitative, which is used as the cut-off for determining if a datapoint should be included a grouping. In some embodiments, the threshold score 141 can include a first threshold entropy score, which can include an entropy score that can be used as the cut-off for determining if a datapoint should be recommended for additional labeling. In some embodiments, the threshold score 141 can include a threshold outlier score (including a first, second, and average threshold outlier score) which can include an outlier score that can be used as the cut-off for determining if a datapoint should be recommended for additional labeling.

The comparison against a threshold score 141 can be used as the basis for generating a recommendation 142. As referred to herein, the recommendation 142 can include a first recommendation to stop or continue the labeling task. In some embodiments, the recommendation 142 can include a recommendation to use or discard the first group as a training sample for a supervised learning task. In some embodiments, the recommendation 142 can include a recommendation to review a first label being assigned to the first text string, or to request a new label be assigned to the first text string.

The recommendation 142 can form the basis for a display step 150. Here, the recommendation 142 can be displayed on a user interface 151 (e.g., a mobile device, a desktop computer, a laptop, etc.). As referred to herein, a user interface can include the point of human-computer interaction and communication in a device, which can include display screens, keyboards, a mouse, a cellphone, the appearance of a desktop, as well as the way by which a user interacts with an application or a website.

The display step 150 can further include receiving a revised message 161. In some embodiments, the revised message 161 can be received from a user. In some embodiments, the revised message 161 can be received from an artificial intelligence model 121. In some embodiments, the revised message 161 can be received from a separately trained machine learning model possessing all of the potential embodiments disclosed and extrapolated in the foregoing description for the artificial intelligence model 121. As referred to herein, the revised message 161 can include a similar format and feature set as the original message 111 from the receiving step 110. In some embodiments, the revised message 161 can include the changes, alterations, or additions suggested by the recommendation 142. In some embodiments, the revised message 161 can include the sparsely labeled dataset from the original message 111, in which the labels have been propagated through the unlabeled datapoints. In some embodiments, the revised message 161 can include the original dataset filtered into separate subsets, the subsets determined by the varying quality of their assigned labels. In some embodiments, the revised message 161 can include a dataset which includes only those datapoints with the most uncertainty in their labels. In some embodiments, the revised message 161 can take the place of the message 111 from the receiving step 110 and act as the input 122 to the artificial intelligence model 121 in a second iteration of the method 100. In some embodiments, the method 100 can proceed to a second iteration in which the revised message 161 is rejected in favor of the original message 111, or an alternate message. In some embodiments, the artificial intelligence model 121 can be replaced with a separate model, re-trained using different training data, or provided with alternate weights from a different pre-trained model. In this fashion, the method 100 can continue through subsequent iterations until canceled or stopped, for example, by user input or if the recommendation 142 includes a stopping condition (e.g., all potential datapoints have been labeled, assessed for consistency, uncertainty, etc.).

Figure 2:
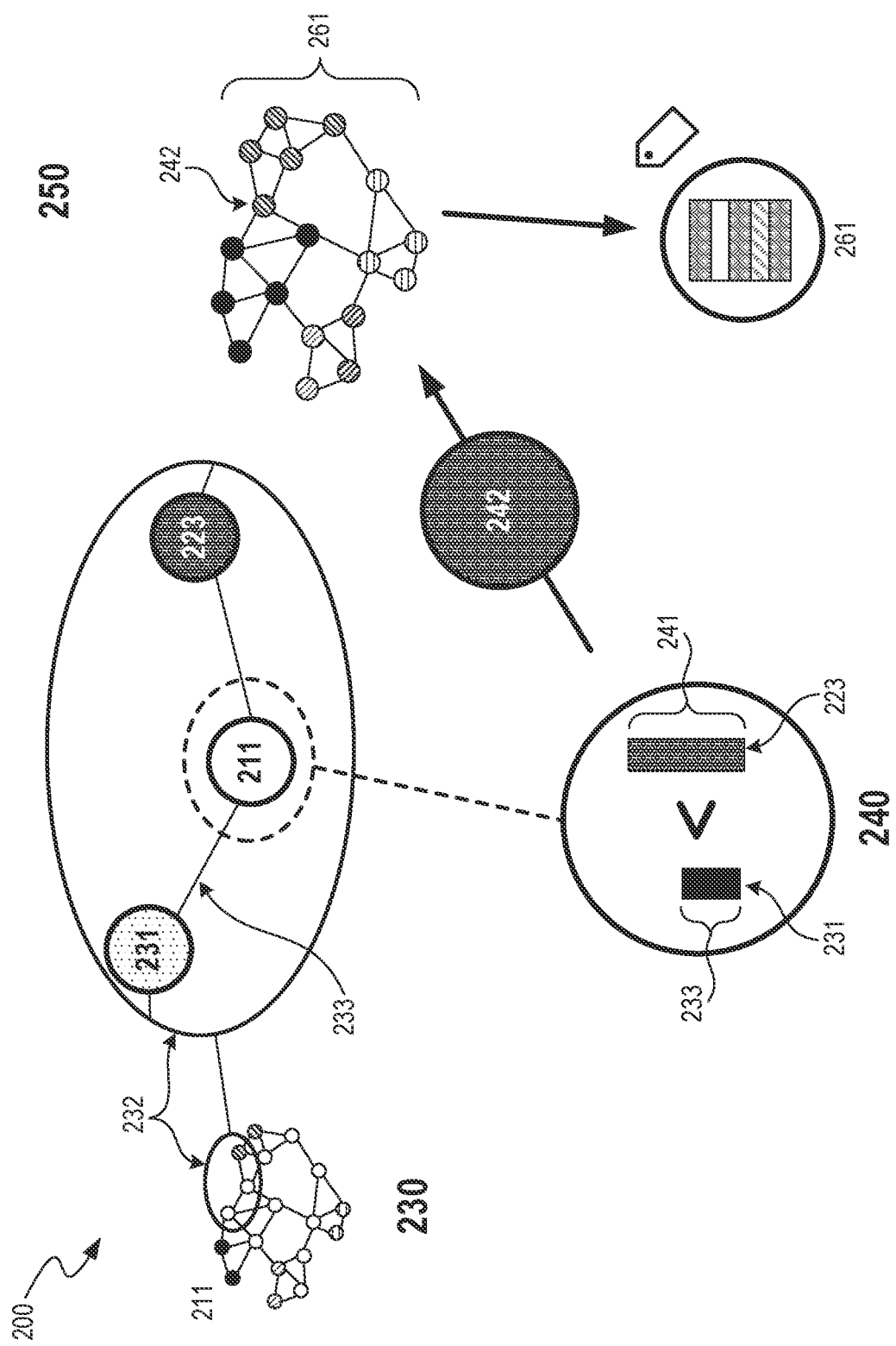
FIG. 2 shows an illustrative diagram for a method for determining a label for a datapoint based on a comparison of a score against a threshold, in accordance with one or more embodiments.

FIG. 2 shows an illustrative diagram for a method 200 for determining a label 231 for a datapoint based on a comparison of a score against a threshold, in accordance with one or more embodiments. The datapoint can be a message 211, the score can be a propagation metric 233, and the threshold can be a threshold score 241.

The message 211 can include a dataset, a labeling task, a first given label for a first text string, a first text string, and/or any information that can be used for propagating labels in a dataset, filtering datapoints based on the quality of their associated labels, or measuring the degree of uncertainty or distance from the mean for datapoints regarding their labels. Furthermore, the message 211 can include a dataset embedded as a semantic graph through the use of a language model (e.g., BERT, XLNet. GPT2, derivatives or combinations of the foregoing language models, other language models, etc.). For example, the semantic graph can be a numeric representation or plotting of text data as datapoints with coordinates, in which a datapoint's coordinates are dependent on the meaning of the corresponding text.

Alternatively, in those embodiments in which the message 211 is a dataset, the dataset can include a first subset having given labels, and a second subset, wherein the second subset makes up between 90 percent and 99.99 percent of the dataset. Additionally, the dataset can have a number of unique tokens, wherein the semantic graph has original dimensions, and wherein the original dimensions have a number less than or equal to the number of unique tokens.

Additionally, the message 211 can be processed in an artificial intelligence model. As referred to herein, an artificial intelligence model can include an algorithm created, trained, and deployed in order to emulate logical decision-making based on available data. In some embodiments, an artificial intelligence model can include a neural network, a statistical distribution, a mathematical function, or an ensemble method that comprises the foregoing networks, distributions, and/or functions, along with other data science or machine learning methods, in which the artificial intelligence model can be trained to approximate a relationship between a range of inputs and a range of outputs 223. As referred to herein, an input, a first input, or a range of inputs can include the domain for a function. As referred to herein, an output, a first output, or a range of outputs can include the range for a function. As referred to herein, the function can include the rule for assigning each input to exactly one output. In some embodiments, the range of inputs can include data of similar formats and types as the message 211 (e.g., a dataset, a semantic graph, or a text string, etc.), and the range of outputs 223 can include an optimal set of dimensions for a labeling task based on an inputted semantic graph, a predicted label given an inputted text string, or a likelihood that an inputted text string corresponds to a predetermined label, etc. In some embodiments, a likelihood may comprise any quantitative or qualitative description of a consistency of two labels. In some embodiments, the artificial intelligence model can be trained on data that does not overlap or include the message 211. In some embodiments, training can involve feed-forward and back-propagation through a neural network, and/or optimization algorithms (e.g., stochastic gradient descent. Limited Memory Broyden Fletcher Goldfarb Shanno, simulated annealing optimization, evolutionary algorithm optimization, particle swarm optimization, etc.). Alternatively, rather than training the model, a series of weights can be transferred to the model from a separate pre-trained model, wherein the weights map a relationship between inputs and outputs of equivalent type and format.

The range of outputs 223 can be used to determine a label 231 for the message 211 in a determining step 230. As referred to herein, the label 231 can be a hard label, and/or it can include a set of dimensions, a probability distribution, a likelihood, etc. In some embodiments, the label 231 is a set of dimensions. As referred to herein, a set of dimensions can include an optimal set of dimensions for the labeling task, which can include a collection of parameters—or inputs—which contribute the most to predicting the output of a function. In some embodiments, the collection of those parameters can be determined through a combination in which the parameters can be operated on or otherwise combined.

The method 200 can include determining a first optimal dimension. To accomplish this, the method 200 can include determining an amount of information present in the message 211 (e.g., a semantic graph), which can be unevenly distributed among the message's original dimensions. The first optimal dimension can have a first amount of information, the first amount of information including a portion of the total amount of information present in the message 211 (e.g., the semantic graph). Then the first optimal dimension can be determined by comparing the first amount of information to a cut-off score. If the first amount of information exceeds the cut-off score, the first optimal dimension can be included in the optimal set of dimensions. If not, the first optimal dimension can be discarded. In other embodiments, determining the first optimal dimension from the original dimensions can include determining an original vector for each dimension from the original dimensions. The next step can then include determining a correlation between the original vector and all other original vectors, wherein the correlation can be a measure of the information shared between that vector and the rest of the graph (e.g., the percentage of the graph's total variance captured by that single vector). The first optimal vector can then determined based on that correlation, e.g., the vector that captures the greatest total variance from the original graph. Such embodiments can further include determining a second optimal dimension from the original dimensions. The second optimal dimension can have a second amount of information, wherein the second amount of information is less than the first amount of information possessed by the first optimal dimension. Combining the first amount of information and the second amount of information into a running total amount of information, and then comparing the running total amount of information to the cut-off score, can result in a decision to either discard the second optimal dimension, or add to the set of optimal dimensions included in the label 231.

Determining the label 231 can be accomplished by means of a propagation step 232, which can include decomposing, transforming, or otherwise using the label 231 as an input to produce a propagation metric 233. The propagation metric 133 can be a measure of distance, of consistency, of entropy, etc. In some embodiments, the propagation metric 233 can be a first likelihood and the threshold score 241 can be a second likelihood. In alternate embodiments, the propagation metric 233 includes a consistency score and the threshold score 241 includes a first threshold consistency score. In other embodiments in which the propagation metric 233 comprises an entropy score, the threshold score 241 can comprise a first threshold entropy score.

For example, in those embodiments in which the label 231 is a set of dimensions, the message 211 is a projection of the semantic graph into a projected graph, and the datapoints (e.g., semantic embeddings of user text data) have likewise been transformed into projections, the label 231 can further comprise a first projection and a second projection, separated by a first distance, with the first distance serving as the basis for the propagation metric 233. In such embodiments, determining the likelihood of a projection possessing a label is accomplished, in part, by measuring the distance between the first and second projection. The first projection can have a first label with a first likelihood, in which the first likelihood measures how likely the first label is to apply to the first projection. Similarly, the second projection can have a second label with a second likelihood. Furthermore, both projections can have either or both the first and second label with their corresponding likelihoods assigned to them, in addition to other labels with other likelihoods. Additionally, a third likelihood can influence the determination of the first projection having the second label; that is, the second projection can have a second label with the third likelihood, which can in turn influence the first projection's second likelihood of having the same second label (e.g., in those embodiments in which the second projection has a very likelihood of having a certain label, the likelihood of the first projection having that same label can be increased, when all other factors included in the propagation metric are held equal (including distance)). In those embodiments where the propagation metric 233 is a distance, the first projection can correspond to a first datapoint in the semantic graph, and the first datapoint can correspond to a first text input from the dataset, belonging to the message 211. When the first likelihood is greater than the second likelihood, the first label can be assigned to the first projection, to the first datapoint, and to the first text input of the message 211. In those embodiments in which the message 211 includes a first subset having given labels, an evaluation of the artificial intelligence model can be determined by comparing a given label to the label 231.

In other embodiments, the label 231 can comprise a predicted label, with a predicted value determined by the artificial intelligence model, and a given label possessing a given value received in the message 211. In these embodiments, the propagation metric 233 can comprise a consistency score that is based on the degree of consensus between the predicted label and the given label. In those cases where the consistency score is average or low, the consensus between the predicted and given labels will be average or low, respectively. Determining the first predicted label for the first text string further can include determining a first datapoint by embedding the first text string in a semantic graph using a language model. After receiving a second label for a second text string, the method 200 can also include embedding the second text string in the semantic graph using the language model, such that the second text string is represented by a second datapoint. The first predicted label can then be determined—in part—on the distance between datapoints. Additionally or alternatively, the method 200 can also include determining a first outlier score based on the distance, the first outlier score being included as part of the propagation metric 233.

The label 231 can be a first given label for a first text string from the message 211. The first given label can be determined by processing the first text string in a first machine learning model trained to predict labels for text string inputs, in which the first machine learning model has been trained separately from the artificial intelligence model which was trained to associate the range of inputs with the range of outputs 223. Alternatively, the first given label for the first text string can be determined from a first user input, received from a user. The method 200 can include receiving a second given label for the first text string and determining a second consistency score for the first text string based on a comparison of the first predicted label and the second given label. The second consistency score for the first text string can be based on a comparison of the first predicted label, the first given label, and the second given label. The first predicted label can include a first probability distribution having a first set of possible labels with first likelihoods, in which the first given label can include a second probability distribution having a second set of possible labels with second likelihoods.

In such embodiments, in which the threshold score 241 is a consistency score, the consistency score can be a first consistency score. Determining the first consistency score can include determining a first measure of center and a first variance metric from the first probability distribution. This can be followed by determining a second measure of center and a second variance metric from the second probability distribution and then determining the degree of consensus based on a comparison of the first measure of center with the second measure of center, combined with a comparison of the first variance metric with the second variance metric. Determining the first consistency score can also include determining an intersection between the first probability distribution and the second probability distribution, wherein the intersection comprises a set of possible labels shared by the first probability distribution and the second probability distribution. Determining the degree of consensus can then be based on a cardinality of the intersection, wherein the degree of consensus increases along with a number of possible labels shared by the first probability distribution and the second probability distribution. Determining the degree of consensus can also include comparing the first set of possible labels with the second set of possible labels to determine a set of shared labels between the first and second set. Then, based on a comparison of the first likelihoods with the second likelihoods in the set of shared labels, the method 200 can include determining a divergence between the first probability distribution and the second probability distribution.

Alternatively, in the method 200, the first given label can be a first hard label, such that the first predicted label is a second hard label, and determining the first consistency score also includes determining an edit distance between the first hard label and the second hard label, such that the edit distance includes a measure of single-character edits needed to change the first hard label into the second hard label. Finally, such embodiments can include determining the degree of consensus based on the edit distance.

In other embodiments, the label 231 can comprise a first likelihood the text string given in the message 211 has a first label component, and a second likelihood the text string given in the message 211 has a second label component. Together, the first and second likelihoods can form a composite likelihood, which can form the basis for the propagation metric 233. The composite likelihood can include a joint probability distribution. In such embodiments, the propagation metric 233 includes a first entropy score. The first entropy score indicates a measure of the uncertainty of the label components in the composite likelihood. For example, the closer in value the first likelihood and the second likelihood, the greater the first entropy score will be (i.e., the greater the uncertainty in determining between the first and second label components).

Determining the first entropy score for the first text string can also include determining a projected improvement to the artificial intelligence model. The projected improvement can be based on the condition a given ground truth label is provided to the artificial intelligence model for the first text string.

Receiving the first text string can include recording a first natural language utterance and then decoding the first natural language utterance into the first text string. Generating the recommendation to review the first label being assigned can also include simultaneously generating an option to assign the first label or a second label. In the method 200, the first label being assigned can be the first label, and generating the recommendation to review the first label further can include assigning the first label to the first text string. Furthermore, the method 200 can then include evaluating the first label and the first text string as a test sample against a machine learning model trained on similar text and label data. In such embodiments, the machine learning model can be trained separately from the artificial intelligence model. Additionally, the method 200 can include receiving a third user input and determining a hard label for the first label component based on the third user input. Alternatively, the method 200 can include receiving a likelihood from the artificial intelligence model and determining a soft label for the first label component based on the likelihood. The method 200 can also include processing the first datapoint in a machine learning model trained to predict labels for datapoint inputs, wherein the machine learning model has been trained separately from the artificial intelligence model. From this, the method 200 can then determine a label prediction for the first datapoint. In the method 200, the second text string can have a second entropy score and a second outlier score, and the method 200 can include determining an average entropy from the first entropy score and the second entropy score, as well as determining an average outlier from the first outlier score and the second outlier score, both the two outlier and two entropy scores included in the propagation metric 233.

Following its determination, the propagation metric 233 can be used in a comparison step 240, where it is compared against the threshold score 241. The threshold score 241 can be determined from the average outlier and the first threshold entropy score from the average entropy.

In other embodiments where the threshold score 241 is a first threshold entropy score, determining the threshold score 241 can include receiving a first user input. From the first user input a first set value can be determined for the first threshold entropy score. Following this step, the method 200 can include receiving a second user input and determining a second set value for the first threshold outlier score based on the second user input.

In other embodiments in which the threshold score 241 is a cut-off score, the cut-off score can be determined based on a first user input received from a user. Alternatively, the cut-off score can have a pre-determined value set between ninety-five and ninety-nine percent of the amount of information in the semantic graph.

As a result of the comparison step 240, a recommendation 242 can be generated. The recommendation 242 can include a first recommendation to stop or continue the labeling task, a recommendation to use or discard the first group as a training sample for a supervised learning task, and/or it can include a recommendation to review a first label being assigned to the first text string, or to request a new label be assigned to the first text string.

Additionally or alternatively, in those embodiments in which the propagation metric 233 includes a first likelihood and the threshold score 241 includes a second likelihood, the comparison can generate a second recommendation to continue the labeling task, the second recommendation included within the recommendation 242.

In those embodiments in which the threshold score 241 includes a first threshold consistency score and the propagation metric 233 includes a first consistency score, the recommendation 242 can include a recommendation to assign a second given label to the first text string. Additionally, in those embodiments in which the first consistency score is greater than the first threshold consistency score, the message 211 (e.g., a first projection) can be filtered to a first group. In such embodiments, the recommendation 242 can include a recommendation to use the first group as a training sample for a supervised learning task.

In those embodiments in which the propagation metric 233 includes an entropy score and/or an outlier score, the recommendation 242 can be selected from a plurality of recommendations based on comparing the first outlier score to a threshold score 241 (e.g., a first threshold outlier score). Additionally or alternatively, in response to comparing the propagation metric (e.g., a first entropy score) to the threshold score (e.g., a first threshold entropy score), the recommendation 242 can include a recommendation to review the first label being assigned to the first projection.

Finally, the recommendation 242 can form the basis for a display step 250. Here, the recommendation 242 can be displayed on a user interface (e.g., a mobile device, a desktop computer, a laptop, etc.). Additionally or alternatively, the display step 250 can further include receiving a revised message 261. The revised message 261 can be received from a user, the artificial intelligence model, or from a separately trained machine learning model possessing all of the potential embodiments disclosed and extrapolated in the foregoing description for the artificial intelligence model. Additionally, the revised message 261 can possess a similar format and feature set as the original message 211 from the receiving step, with the exception that the revised message 261 also includes the changes, alterations, or additions suggested by the recommendation 242. In such embodiments, the revised message 261 can include the sparsely labeled dataset from the original message 211, in which the labels have been propagated through the unlabeled datapoints, the original dataset filtered into a separate high-quality and/or low-quality dataset, a dataset which includes only those datapoints with the most uncertainty in their labels, or some combination of the foregoing, etc. Additionally or alternatively, the revised message 261 can take the place of the message 211 from the receiving step and act as the input to the artificial intelligence model in a second iteration of the larger method. Alternately, the larger method can proceed to a second iteration in which the revised message 261 is rejected in favor of the original message 211, or an alternate message. In such embodiments, the artificial intelligence model can be replaced with a separate model, re-trained using different training data, or provided with alternate weights from a different pre-trained model. In this fashion, the larger method can continue through subsequent iterations until canceled or stopped, for example, by user input or when the recommendation 242 includes a stopping condition (e.g., all potential datapoints have been labeled, assessed for consistency, uncertainty, etc.).

Figure 3:
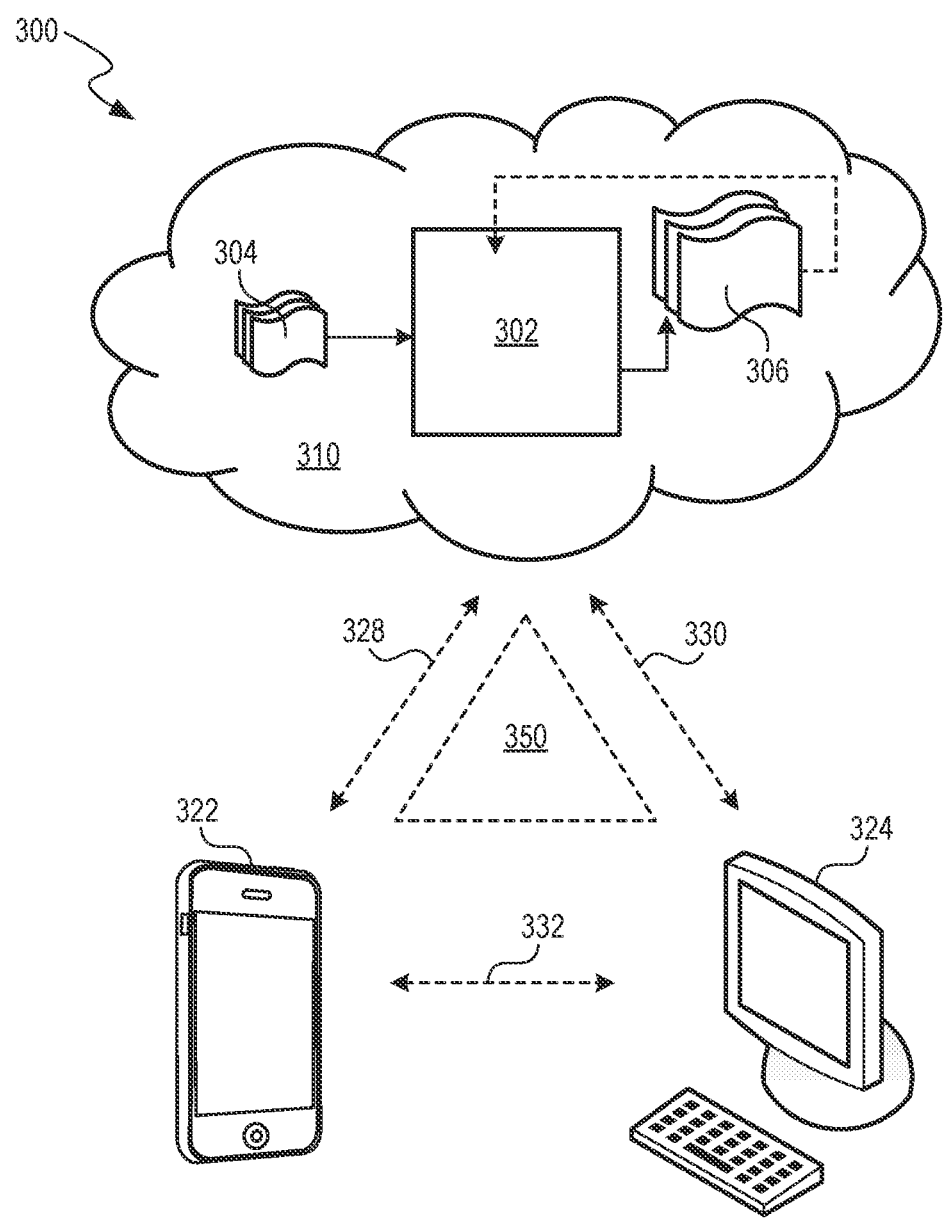
FIG. 3 shows illustrative components for a system used to propagate and filter labels in a dataset while also improving training efficiency, in accordance with one or more embodiments.

FIG. 3 shows illustrative components for a system 300 used to propagate and filter labels in a dataset while also improving training efficiency, in accordance with one or more embodiments.

As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

The system 300 can include communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include data structures, such a message 111. The message 111 can include a dataset, a labeling task, a first given label for a first text string, a first text string, or any information that could be used for propagating labels in a dataset, filtering datapoints based on the quality of their associated labels, or measuring the degree of uncertainty or distance from the mean for datapoints regarding their labels. Artificial intelligence model 121, inputs 122, outputs 123, labels 131, propagation metrics 133, threshold scores 141, recommendations 142 and/or revised messages 161 may be included within cloud components 310, for example, in cloud storage.

Cloud components 310 may access input data, such as training data, datasets, labeling tasks, labels for text strings, text strings, or any information that could be used for propagating labels in a dataset, filtering datapoints based on the quality of their associated labels, or measuring the degree of uncertainty or distance from the mean for datapoints regarding their labels, which may be received from mobile device 322 or user terminal 324, for example, through communication paths 328, 330 or 332.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a prediction for a label associated with unlabeled data, or a prediction for which label may fit a datum best out of a choice of labels).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302 (e.g., which labels with which to label).

In some embodiments, the model (e.g., model 302) may automatically perform actions based on outputs 306. In some embodiments, the model (e.g., model 302) may not perform any actions. The output of the model (e.g., model 302) may be used to propagate labels in a dataset, filter datapoints based on the quality of their associated labels, or measure the degree of uncertainty or distance from the mean for datapoints regarding their labels. For example, the output of the model may determine a sentiment or type of data based on input textual data.

System 300 also includes API layer 350. API layer 350 may allow the system to generate summaries across different devices. In some embodiments. API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript, SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases. API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases. API layer 350 may use commercial or open-source API Platforms and their modules. API layer 350 may use a developer portal. API layer 350 may use strong security constraints applying WAF and DDoS protection, and API layer 350 may use RESTful APIs as standard for external integration.

Figure 4:
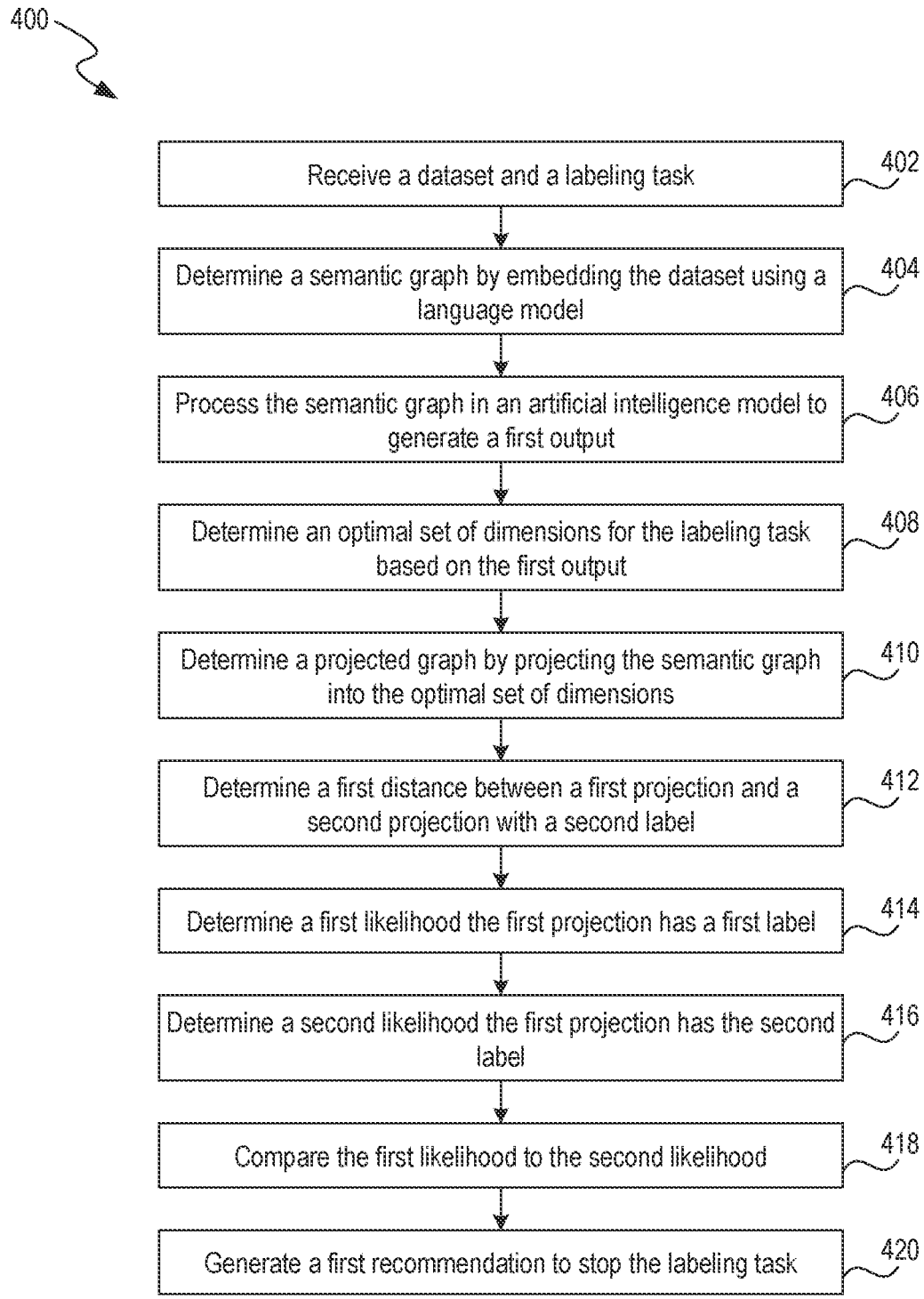
FIG. 4 shows a flowchart of the steps involved in label propagation using supervised projections of semantic embeddings, in accordance with one or more embodiments.

FIG. 4 shows a flowchart of the steps involved in label propagation using supervised projections of semantic embeddings, in accordance with one or more embodiments. For example, the system may use process 400 (as implemented on one or more system components described above) in order to programmatically assign labels to unlabeled datapoints in a sparsely labeled datasets, using those datapoints which do have labels as a basis for all such labeling assignments.

At step 402, process 400 (using one or more components described above) receives a dataset and a labeling task. For example, the system may first receive a dataset which includes unlabeled data, and then receive a labeling task, or it may receive them in the opposite order, or simultaneously. The dataset can be a sparsely labeled dataset. The labeling task can include an objective and a stopping condition, with the objective being to propagate labels from the first subset to the second subset, and the stopping condition occurring when every datapoint included in the second subset has a label assigned to it. The label assignment can be based on the label having a likelihood greater than any other potential label's likelihood. By doing so, the system can have a defined approach by which to propagate labels throughout the dataset.

In some embodiments, the dataset can include a first subset and a second subset. For example, the system may include a sparsely labeled dataset that itself includes a first subset having given labels, and a second subset having no labels. By doing so, the system may propagate labels from one subset, having labels, to another, having none.

In some embodiments, the second subset can make up a majority of the dataset. For example, the system may have the second subset, with no labels, make up between 90 percent and 99.999 percent of the dataset. By doing so, the system may propagate labels from a relatively miniscule subset to a subset that is dramatically larger.

At step 404, process 400 (using one or more components described above) translates the dataset into a coordinate space. For example, the system may determine a semantic graph by embedding the dataset using a language model (e.g., BERT. XLNet, GPT2, derivatives or combinations of the foregoing language models, other language models, etc.). By doing so, the system may enable mathematical comparisons of similarity to be drawn between those datapoints which have labels and those which do not, in order to assist in determining label likelihood.

In some embodiments, the semantic graph can have a number of original dimensions. For example, the system may have a semantic graph with a number of original dimensions, wherein the number of original dimensions can be equal to a number of unique tokens contained within the dataset (e.g., a one-hot encoding). By doing so, the system may construct a highly granular graphical representation of the original dataset, in which independence is assumed between all of the unique tokens which the dataset comprises.

In some embodiments, the semantic graph's original dimensions can number less than the number of unique tokens contained within the dataset. For example, the system may include dimensions which exist as a representation of multiple, highly correlated tokens from the original dataset. By doing so, the system may represent dependency relationships between tokens, which can lead the eventual model to make better generalizations about the underlying data represented by the graph, which the dataset comprises.

At step 406, process 400 (using one or more components described above) processes the semantic graph in an artificial intelligence model. For example, the system may process the semantic graph in an artificial intelligence model to generate a first output, wherein the artificial intelligence model is trained to output optimal sets of dimensions for labeling tasks based on inputted semantic graphs. The artificial intelligence model can include a neural network, a statistical distribution, a mathematical function, or an ensemble method that comprises the foregoing networks, distributions, and/or functions, along with other data science or machine learning methods, in which the artificial intelligence model can be trained to approximate a relationship between a range of inputs and a range of outputs. The range of inputs can include data of similar formats and types as the dataset. The range of outputs can include the first output, which can include an optimal set of dimensions for a labeling task based on an inputted semantic graph. Training can involve feed-forward and back-propagation through a neural network, and/or optimization algorithms (e.g., stochastic gradient descent, Limited Memory Broyden Fletcher Goldfarb Shanno, simulated annealing optimization, evolutionary algorithm optimization, particle swarm optimization, etc.). By doing so, the system may create supervised projections of the semantic embeddings, facilitating a machine learning model to find non-obvious connections between related tokens.

In some embodiments, the artificial intelligence model can be trained on data that does not overlap or include the dataset. For example, the system may include alternate data for the purpose of training the artificial intelligence model, the alternate data comprising features and datatypes that are equivalent to those possessed by the dataset being used for the label propagation task. By doing so, the system may train the artificial intelligence model to identify general patterns in the data without over-fitting to datapoints that are specific to the training data, and thereby achieve a misleadingly high accuracy in the label propagation task.

In some embodiments, rather than training the model 121, a series of weights can be transferred to the model 121. For example, the system may transfer a series of weights to the model from a separate pre-trained model, wherein the weights map a relationship between inputs and outputs of equivalent type and format as the dataset. By doing so, the system may save the time and resources needed to train the artificial intelligence model 121.

At step 408, process 400 (using one or more components described above) determines an alternate graphical space for the labeling task. For example, the system may determine an optimal set of dimensions for the labeling task based on the first output. In a practical embodiment, a first optimal dimension could be used to represent several of the original dimensions, representing those tokens from the original dataset which are highly correlated and can be generalized to a single optimal dimension. By doing so, the system may represent dependency relationships between tokens, which can lead the eventual model to make better generalizations about the underlying data represented by the graph, which the dataset comprises.

In some embodiments, the system may determine an amount of information present in the semantic graph, wherein the amount of information is unevenly distributed among the original dimensions of the semantic graph. A first optimal dimension is then be determined, wherein the first optimal dimension has a first amount of information, the first amount of information including a portion of the amount of information present in the semantic graph. If the first amount of information exceeds a cut-off score, then the first optimal dimension is included in the optimal set of dimensions. If not, the first optimal dimension can be discarded. By doing so, the system may progressively include only those optimal dimensions into the set of optimal dimensions that possess a requisite amount of information (e.g., variance).

In some embodiments, determining the first optimal dimension from the original dimensions can include determining an original vector for each dimension from the original dimensions. For example, the system may determine a correlation between the original vector and all other original vectors in the semantic graph, wherein the correlation can be a measure of information shared between that vector and the rest of the graph (e.g., the percentage of the graph's total variance captured by that single vector). In a practical embodiment, the first optimal vector is then determined based on that correlation, e.g., the single vector that captures the greatest total variance from the original graph. By doing so, the system may select optimal dimensions based on the principle of eliminating redundancies across the original dimensions.

In some embodiments, the process 400 can further include determining a second optimal dimension from the original dimensions. For example, the second optimal dimension can have a second amount of information, wherein the second amount of information is less than the first amount of information possessed by the first optimal dimension. In a practical embodiment, combining the first amount of information and the second amount of information into a running total amount of information, and then comparing the running total amount of information to the cut-off score, can result in a decision to either discard the second optimal dimension, or add it to the set of optimal dimensions. By doing so, the system may incrementally add to its set of optimal dimensions, while avoiding adding optimal dimensions which in fact possesses less information (e.g., variance) than the original dimensions which it seeks to generalize for the purposes of training a machine learning model.

At step 410, process 400 (using one or more components described above) determines a projected graph. For example, the system may determine a projected graph by projecting the semantic graph into the optimal set of dimensions. The system may do this by building a projector based on pre-collected labeled data included in the labeling task. In mathematics, a projection is a mapping of a set (e.g., the semantic graph) into a subset or subspace (e.g., the projected graph). In a practical embodiment, the embeddings of the semantic graph become projections in the projected graph, wherein both the embeddings and the projections are represented by vectors, which themselves represent the meaning of text data from the original unprocessed dataset received in step 402. By doing so, the system may capture the greatest amount of information from the semantic graph (e.g., the greatest amount of variance) in as few novel dimensions as possible.

At step 412, process 400 (using one or more components described above) determines a first distance. For example, the system may determine a first distance between a first projection and a second projection with a second label. In a practical embodiment, the first distance can be a Euclidean distance calculated using a distance formula (e.g., the Pythagorean theorem), a Manhattan distance, a Jaccard similarity, or an edit distance (e.g., Levenshtein distance, Hamming distance. Jaro distance, LCS distance, etc.) calculated. Additionally or alternatively, the first distance can be a cosine similarity or a cosine distance. By doing so, the system may derive a valid benchmark for similarity between apparently dissimilar data, for example, text data.

At step 414, process 400 (using one or more components described above) determines a first likelihood. For example, the system may determine a first likelihood the first projection has a first label. In a practical embodiment, the first likelihood can be determined in part on a second distance calculated between the first projection and a third projection with the first label. If the second distance between projections is large, then the first likelihood will be small. By doing so, the system may graphically represent semantic relationships through features of the projections (e.g., distance), which were derived through a supervised learning task for such a purpose.

At step 416, process 400 (using one or more components described above) determines a second likelihood. For example, the system may determine a second likelihood the first projection has the second label. In a practical embodiment, the second likelihood may be based in part on the first distance between the first projection and the second projection. As the first distance decreases, the second likelihood increases. By doing so, the system may apply those features which it has learned from the supervised projections toward the labeling task of otherwise seemingly unrelated data which the dataset comprises (e.g., text data).

At step 418, process 400 (using one or more components described above) compares the first likelihood to the second likelihood. For example, the system may compare the first likelihood to the second likelihood by combining the likelihoods to form a composite likelihood, and then assigning the composite likelihood to the first projection, as well as to its corresponding embedding from the semantic graph, as well as to the corresponding text from the dataset. In a practical embodiment, the comparison can include assigning the label associated with the greater likelihood to the first projection. By doing so, the system may derive a more nuanced form of labeling that is sensitive to changes in the projected space, allowing for projections to change labels as various likelihoods contained within the composite likelihoods increase or decrease in value.

At step 420, process 400 (using one or more components described above) generates a first recommendation. For example, the system may generate for display, on a user interface, a first recommendation to stop the labeling task in response to comparing the first likelihood to the second likelihood. In a practical embodiment, the system can generate the first recommendation when all potential datapoints have been labeled. By doing so, the system may halt the task when labels have been propagated throughout the entire sparsely labeled dataset. Additionally, the system may also generate for display the projected graph along with the semantic graph, evaluating which is an optimal graph for embedding the likelihood that text may have semantic information similar to other text. In future iterations of the process, this optimal graph may be used instead for calculating likelihoods.

In some embodiments, the process 400 can generate a second recommendation. For example, the system may generate a second recommendation to continue the labeling task. In a practical embodiment, the second recommendation can be accompanied by an evaluation of the artificial intelligence model. The evaluation can be determined by comparing the label assigned to the first projection with a given label, if the first projection belongs to the first subset having given labels. By doing so, the system may reiterate the label propagation task, employing separate models or methods to derive likelihoods, or optimal dimensions, until those metrics comprised within the evaluation are satisfied.

In all of the foregoing steps, the projections can have as many labels with as many likelihoods as there are projections in the projected graph, in which case the determination for a single projection's label can include calculating the distance between that projection and most proximate neighboring projections, or—in other embodiments—all of the other projections in the graph.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
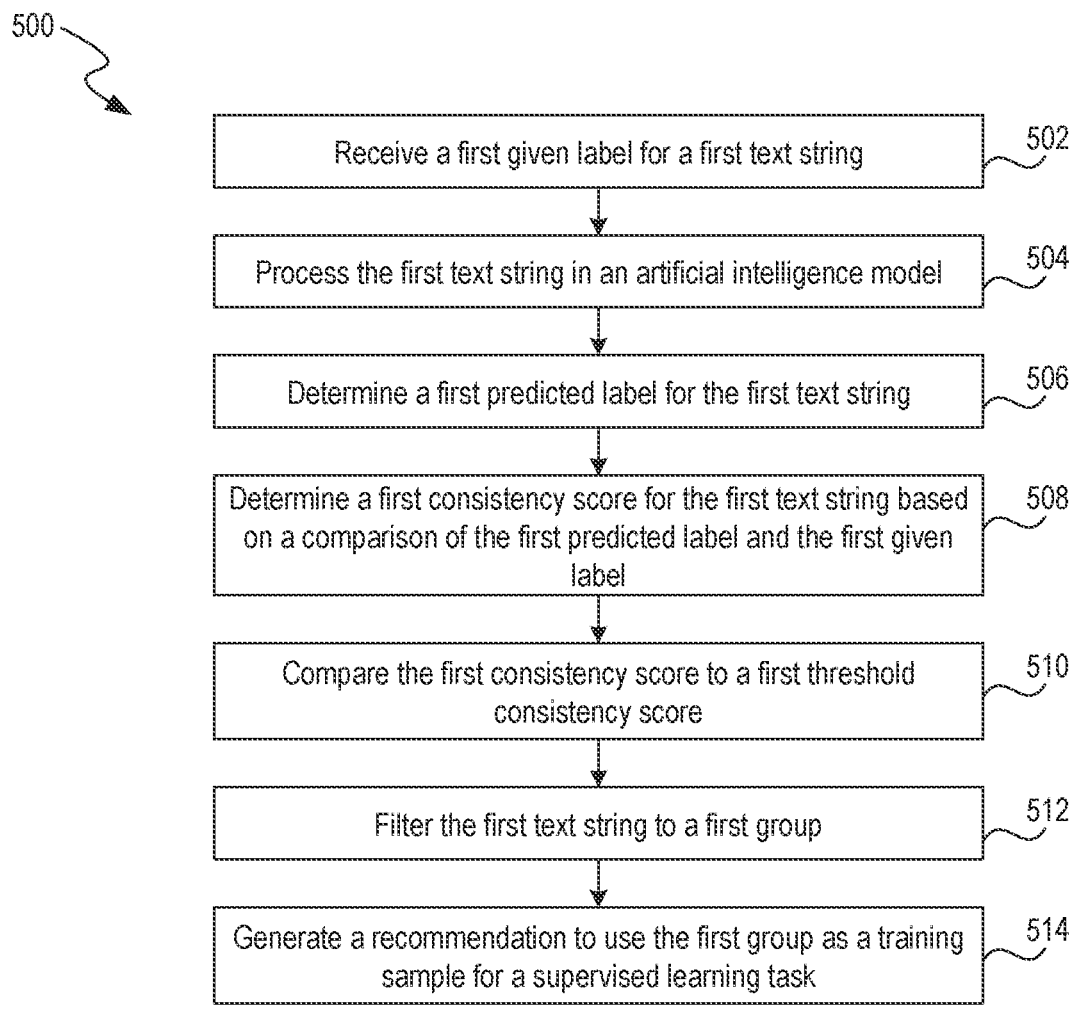
FIG. 5 shows a flowchart of the steps involved in label quality assurance using consistency scores, in accordance with one or more embodiments.

FIG. 5 shows a flowchart of the steps involved in label quality assurance using consistency scores, in accordance with one or more embodiments. For example, the system may use process 500 (e.g., as implemented on one or more system components described above) in order to use consistency scores to provide label quality assurance.

At step 502, process 500 (using one or more components described above) receives a label. For example, the system may receive a first given label for a first text string. In a practical embodiment, the first text string can be included as part of a dataset, which can be a sparsely labeled dataset. The first given label can be a soft label (e.g., a probability, a probability distribution, etc.) or a hard label. The hard label can be a class assignment represented by a natural language token (e.g., "cat," "red," "Thanksgiving Day Parade." etc.), or a symbol (e.g., vector, tensor, graph coordinates, cipher, numeral, etc.), assigned by a human annotator or a data science method or machine learning model. By doing so, the system may possess a "gold-standard" label it can use as a basis for comparison against an eventual predicted label.

At step 504, process 500 (using one or more components described above) processes the first text string in an artificial model. For example, the artificial intelligence model can include a neural network, a statistical distribution, a mathematical function, or an ensemble method that comprises the foregoing networks, distributions, and/or functions, along with other data science or machine learning methods, in which the artificial intelligence model can be trained to approximate a relationship between a range of inputs and a range of outputs. The range of inputs can include data of similar formats and types as the first text string. By doing so, the system may learn to approximate a function for programmatically assessing the quality of text string labels without the assistance of a human annotator.

At step 506, process 500 (using one or more components described above) determines a label. For example, the system may determine a first predicted label for the first text string. In a practical embodiment, the first predicted label can be included among the range of outputs, and may have a similar format and type as the first given label. By doing so, the system may derive a predicted label to act as a hypothesis which it can test against other labels, either received or predicted, for the purpose of finding consensus.

At step 508, process 500 (using one or more components described above) determines a consistency score. For example, the system may determine a first consistency score for the first text string based on a comparison of the first predicted label and the first given label. In a practical embodiment, there can be more labels assigned to the first text string other than the predicted label and the first given label, with each label being assigned by distinct models, methods, and human annotators. The first consistency score can be based on a comparison of all such assigned labels, or a subset, the subset of assigned labels determined by a reliability metric. The first consistency score can be determined by calculating a Kullback-Leibler divergence between the labels, in the case that the labels are probability distributions. Alternatively, in the case the labels are hard labels, the consistency score can be a count of all such labels which agree, either completely or within a certain edit distance. By doing so, the system may determine a measure of a label's quality by comparing it to other labels.

At step 510, process 500 (using one or more components described above) compares the consistency score to a threshold. For example, the system may compare the first consistency score to a first threshold consistency score. In a practical embodiment, the first threshold consistency score can be a value given by a user, or it can be determined based on properties of a larger dataset which includes the first text string among other text string data. In the latter case, the first threshold consistency score may be determined so as to maintain a certain distribution of consistency scores across the dataset. By doing so, the system may establish a cut-off for labels, enabling it to filter datapoints based on their label quality.

At step 512, process 500 (using one or more components described above) filters the text string. For example, the system may filter the first text string to a first group. In a practical embodiment, the process 500 may filter the first text string to a second group. By doing so, the system may differentiate between datapoints on the basis of their label quality, distinguishing between high quality and low quality subsets.

At step 514, process 500 (using one or more components described above) generates a recommendation. For example, the system may generate a recommendation to use the first group as a training sample for a supervised learning task. In a practical embodiment, the system may generate a recommendation to submit the second group for an additional iteration of the process 500 so that the text strings within the second group can receive further labeling. By doing so, the system may only provide those text strings which include high quality labels as training data for a supervised learning task, thereby boosting the accuracy and/or recall of the model being trained. The system may also provide the benefit of reiterating the process for those text strings with low quality labels, for the purpose of creating more fine-grained distinctions within the group and potentially learning those subtle patterns within the text data which may be confounding the labeling models and/or human annotators.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
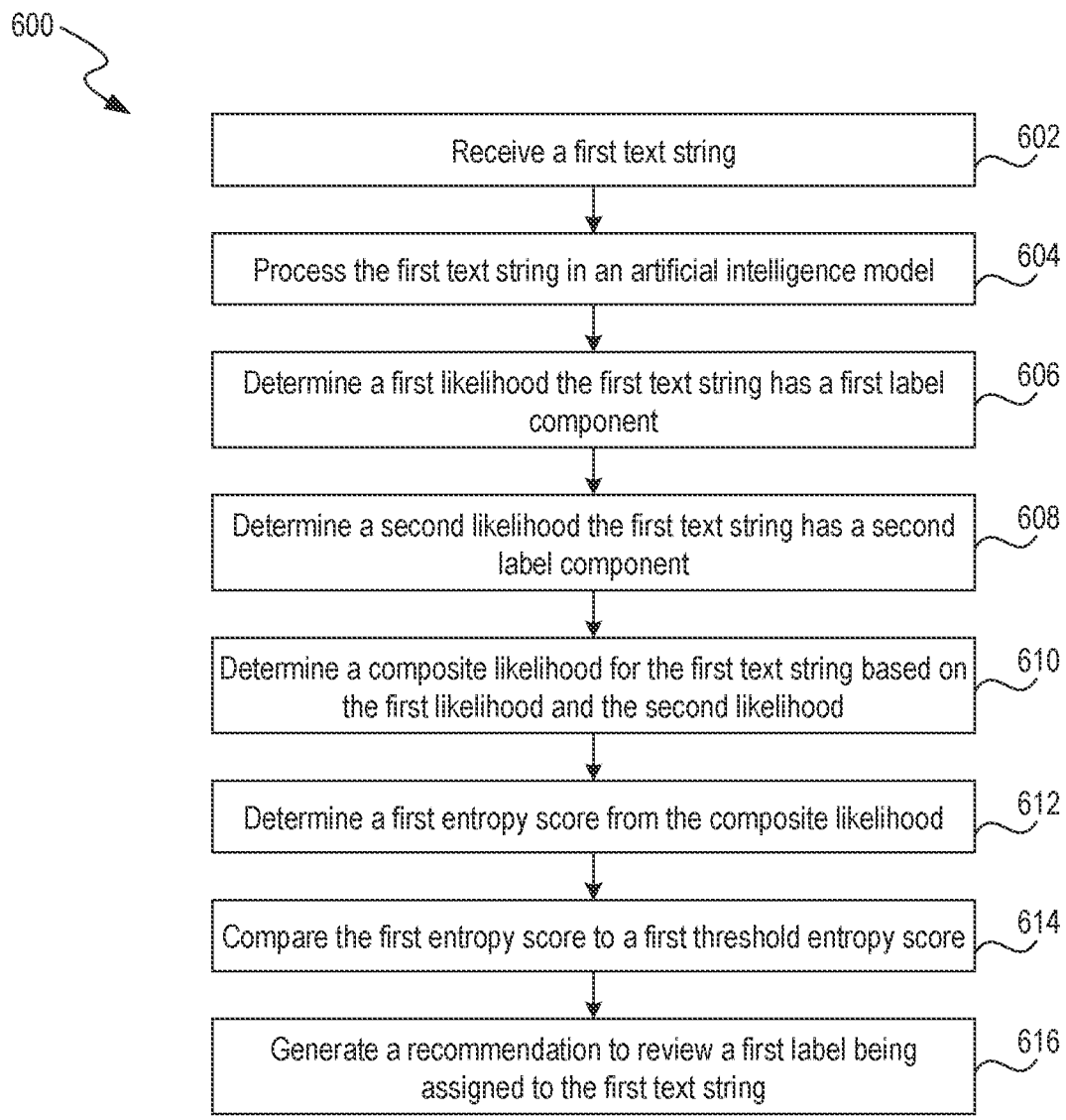
FIG. 6 shows a flowchart of the steps involved in optimizing data labeling using entropy scores for use in an artificial neural network model using natural language processing, in accordance with one or more embodiments.

FIG. 6 shows a flowchart of the steps involved in optimizing data labeling using entropy scores for use in an artificial neural network model using natural language processing, in accordance with one or more embodiments. For example, the system may use process 600 (e.g., as implemented on one or more system components described above) in order to optimize data labeling using entropy scores for use in an artificial neural network model using natural language processing.

At step 602, process 600 (using one or more components described above) receives a string. For example, the system may receive a first text string. In a practical embodiment, the first text string can be a natural language utterance, recorded and decoded either by an Automatic Speech Recognition model or by a human transcriber. The first text string can be unedited or preprocessed. Preprocessing can include translation, tokenization, lemmatization, removing stop words, and/or correcting spelling and grammar. By doing so, the system may have a basis by which to optimize the labeling of a dataset.

At step 604, process 600 (using one or more components described above) processes the string in a model. For example, the system may process the first text string in an artificial intelligence model. In a practical embodiment, the artificial intelligence model can include a neural network, a statistical distribution, a mathematical function, or an ensemble method that comprises the foregoing networks, distributions, and/or functions, along with other data science or machine learning methods, in which the artificial intelligence model can be trained to approximate a relationship between a range of inputs and a range of outputs. The range of inputs can include data of similar formats and types as the first text string, and the range of outputs can include a likelihood that an inputted text string corresponds to a label component. The artificial intelligence model can be trained on data that does not overlap or include the first text string. Training can involve feed-forward and back-propagation through a neural network, and/or optimization algorithms (e.g., stochastic gradient descent. Limited Memory Broyden Fletcher Goldfarb Shanno, simulated annealing optimization, evolutionary algorithm optimization, particle swarm optimization, etc.). Alternatively, rather than training the model, a series of weights can be transferred to the model from a separate pre-trained model, wherein the weights map a relationship between inputs and outputs of equivalent type and format to the first text string. By doing so, the system may programmatically determine a probability that a text string can be given a label without the assistance of a human annotator.

At step 606, process 600 (using one or more components described above) determines likelihood. For example, the system may determine a first likelihood the first text string has a first label component. In a practical embodiment, the label component can be a soft label (e.g., a probability, a probability distribution, etc.) or a hard label. The hard label can be a class assignment represented by a natural language token (e.g., "cat," "red," "Thanksgiving Day Parade." etc.), or a symbol (e.g., vector, tensor, graph coordinates, cipher, numeral, etc.), assigned by a human annotator or a data science method or machine learning model. By doing so, the system may programmatically determine a probability that a text string can be given a label with the ultimate goal of drawing a distinction between those text strings which can be labeled with low probability being recommended for additional labeling.

At step 608, process 600 (using one or more components described above) determines a second likelihood. For example, the system may determine a second likelihood the first text string has a second label component. In a practical embodiment, additional likelihoods for additional labels can be determined for the first text string by the same artificial intelligence model, or by a model with an equivalent architecture but trained on separate data, or by different data science methods or machine learning models. By doing so, the system may programmatically determine a probability that a text string can be given a label, and then compare that label against another determined label with its own likelihood, for the ultimate purpose of determining the level of uncertainty in a given text string having a definitive label.

At step 610, process 600 (using one or more components described above) determines a composite likelihood. For example, the system may determine a composite likelihood for the first text string based on the first likelihood and the second likelihood. In a practical embodiment, the composite likelihood can be a joint probability distribution. By doing so, the system may construct a more nuanced soft label for a text string, comprising multiple likelihoods associated with sub-labels, which can be more sensitive to changes in the overall dataset as additional text strings are received.

At step 612, process 600 (using one or more components described above) determines an entropy. For example, the system may determine a first entropy score from the composite likelihood. In a practical embodiment, the first entropy score indicates a measure of the uncertainty of the label components in the composite likelihood. The closer in value the first likelihood and the second likelihood, the greater the first entropy score will be (i.e., the greater the uncertainty in determining between the first and second label components). Determining the first entropy score for the first text string can also include determining a projected improvement to the artificial intelligence model. The projected improvement can be based on the condition a given ground truth label is provided to the artificial intelligence model for the first text string. By doing so, the system may distinguish between those labels which have the greatest uncertainty in their labeling (e.g., text string which exist equidistant from text strings with labels that have label components with equal likelihood), and submit them for additional labeling (e.g., to a human annotator, such as a domain expert), and thereby optimize what would otherwise be a laborious labeling task.

In some embodiments, the first entropy score can also include a first outlier score. For example, the system may determine the first outlier score by calculating a measure of center for the dataset. In a practical embodiment, the measure of center for the dataset can be an actual text string having a smallest distance to the measure of center, or it can be a construction calculated to best approximate the most average text string for the dataset. The outlier score can be based on a distance, the distance determined between the first text string and the most average text string. By doing so, the system may also recommend those text strings for additional labeling which may have a relatively high certainty in their labeling, but are so unlike all of the other text strings that this certainty cannot be relied upon with great confidence (e.g., an outlier which is far removed from a single other text string having a label with a high likelihood).

At step 614, process 600 (using one or more components described above) compares the entropy to a cut-off score. For example, the system may compare the first entropy score to a first threshold entropy score. In a practical embodiment, a second text string can have a second entropy score and a second outlier score, and the process 600 can include determining an average entropy from the first entropy score and the second entropy score, as well as determining an average outlier from the first outlier score and the second outlier score. The first threshold entropy score can be determined from the average outlier and the first threshold entropy score from the average entropy. In other embodiments, determining the first threshold entropy score can include receiving a first user input. From the first user input a first set value can be determined for the first threshold entropy score. Following this step, the process 600 can include receiving a second user input and determining a second set value for the first threshold outlier score based on the second user input. By doing so, the system may make a distinction between those text strings which have a relatively high certainty in their labels, versus those text strings which can be recommended for additional labeling, and thereby optimize a dataset annotation task for a human annotator (e.g., a domain expert).

At step 616, process 600 (using one or more components described above) generates a recommendation. For example, the system may generate a first recommendation to stop the labeling task. In a practical embodiment, generating the recommendation to review the first label being assigned can also include simultaneously generating an option to assign the first label or a second label. The first label being assigned can be the first label, and generating the recommendation to review the first label further can include assigning the first label to the first text string. Furthermore, the process 600 can then include evaluating the first label and the first text string as a test sample against a machine learning model trained on similar text and label data. In such embodiments, the machine learning model can be trained separately from the artificial intelligence model. Additionally, the process 600 can include receiving a third user input and determining a hard label for the first label component based on the third user input. Alternatively, the process 600 can include receiving a likelihood from the artificial intelligence model and determining a soft label for the first label component based on the likelihood. The process 600 can also include processing the first datapoint in a machine learning model trained to predict labels for datapoint inputs, wherein the machine learning model has been trained separately from the artificial intelligence model. From this, the process 600 can then determine a label prediction for the first datapoint. By doing so, the system may only recommend those text strings for human annotation which cannot be labeled by a programmatic label propagation technique with great certainty.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for propagating labels through a sparsely labeled dataset using a projection of an embedding will be better understood with reference to the following enumerated embodiments:

A1. A method, the method comprising: receiving the sparsely labeled dataset, receiving a labeling task, determining a semantic graph by embedding the sparsely labeled dataset using the language model, processing the semantic graph in the artificial intelligence model, receiving a first output from the artificial intelligence model, based on the first output, determining an optimal set of dimensions for the labeling task, determining a projected graph by projecting the semantic graph into the optimal set of dimensions, selecting a first projection from the projected graph, wherein the first projection corresponds to a first datapoint in the semantic graph, and wherein the first datapoint corresponds to a first text input from the sparsely labeled dataset, determining a first distance between the first projection and a second projection in the projected graph, determining a first likelihood the first projection has a first label, determining a second likelihood the first projection has a second label based in part on the first distance to the second projection, comparing the first likelihood to the second likelihood, and generating for display, on a user interface, a recommendation to stop the labeling task.

A2. A method, the method comprising: receiving a dataset; receiving a labeling task; determining a semantic graph by embedding the dataset using a language model; processing the semantic graph in an artificial intelligence model to generate a first output, wherein the artificial intelligence model is trained to output optimal sets of dimensions for labeling tasks based on inputted semantic graphs; based on the first output, determining an optimal set of dimensions for the labeling task; determining a projected graph by projecting the semantic graph into the optimal set of dimensions; determining a first distance between the first projection and a second projection in the projected graph, wherein the second projection has a second label; determining a first likelihood the first projection has a first label; determining a second likelihood the first projection has the second label based in part on the first distance to the second projection; comparing the first likelihood to the second likelihood; and in response to comparing the first likelihood to the second likelihood, generating for display, on a user interface, a first recommendation to stop the labeling task.

A3. The method of any one of the preceding embodiments, further comprising: selecting a first projection from the projected graph, wherein the first projection corresponds to a first datapoint in the semantic graph, and wherein the first datapoint corresponds to a first text input from the dataset.

A4. The method of any one of the preceding embodiments, further comprising: in response to comparing the first likelihood to the second likelihood, generating for display, on the user interface, a second recommendation to continue the labeling task.

A5. The method of any one of the preceding embodiments, further comprising: determining the second likelihood the first projection has the second label is based in part on a third likelihood the second projection has the second label.

A6. The method of any one of the preceding embodiments, further comprising: determining a composite likelihood from the first likelihood and the second likelihood; determining a first entropy score from the composite likelihood, wherein the first entropy score indicates randomness of label components in the composite likelihood; comparing the first entropy score to a first threshold entropy score; and in response to comparing the first entropy score to the first threshold entropy score, generating for display, on the user interface, a third recommendation to review the first label being assigned to the first projection.

A7. The method of any one of the preceding embodiments, further comprising: determining a first predicted label for the first projection; determining a first consistency score for the first projection based on a comparison of the first predicted label and the first label, wherein the first consistency score indicates a degree of consensus between the first predicted label and the first label; comparing the first consistency score to a first threshold consistency score; in response to comparing the first consistency score to the first threshold consistency score, filtering the first projection to a first group; and generating for display, on the user interface, a fourth recommendation to use the first group as a training sample for a supervised learning task.

A8. The method of any one of the preceding embodiments, further comprising: determining a first outlier score based on the first distance; comparing the first outlier score to a first threshold outlier score; and selecting a recommendation from a plurality of recommendations based on comparing the first outlier score to a first threshold outlier score.

A9. The method of any one of the preceding embodiments, further comprising: the dataset comprises a first subset having given labels, and a second subset, wherein the second subset makes up between 90 percent and 99.99 percent of the dataset.

A10. The method of any one of the preceding embodiments, further comprising: the first likelihood is greater than the second likelihood, and wherein comparing the first likelihood to the second likelihood further comprises assigning the first label to the first projection, assigning the first label to the first datapoint, and assigning the first label to the first text input.

A11. The method of any one of the preceding embodiments, further comprising: the first subset comprises the first text input having the first label, comparing the first label to a corresponding given label from the given labels of the first subset; and determining an evaluation of the artificial intelligence model in response to comparing the first label to the corresponding given label.

A12. The method of any one of the preceding embodiments, further comprising: the dataset has a number of unique tokens, wherein the semantic graph has original dimensions, and wherein the original dimensions have a number less than or equal to the number of unique tokens.

A13. The method of any one of the preceding embodiments, further comprising: determining an amount of information present in the semantic graph, wherein the amount of information is unevenly distributed among the original dimensions; determining a first optimal dimension from the original dimensions, wherein the first optimal dimension has a first amount of information, and wherein the first amount of information comprises a portion of the amount of information present in the semantic graph; comparing the first amount of information to a cut-off score; and in response to comparing the first amount of information to the cut-off score, including the first optimal dimension in the optimal set of dimensions.

A14. The method of any one of the preceding embodiments, further comprising: determining an original vector for each original dimension of the original dimensions; determining a correlation between the original vector and all other original vectors, wherein the correlation comprises a measure of shared information; determining a first optimal vector based on the correlation; and determining the first optimal dimension from the first optimal vector.

A15. The method of any one of the preceding embodiments, further comprising: determining a second optimal dimension from the original dimensions, wherein the second optimal dimension has a second amount of information, and wherein the second amount of information is less than the first amount of information; combining the first amount of information and the second amount of information into a running total amount of information; comparing the running total amount of information to the cut-off score; and in response to comparing the running total amount of information to the cut-off score, discarding the second optimal dimension.

A16. The method of any one of the preceding embodiments, further comprising: receiving a first user input; and determining the cut-off score based on the first user input.

A17. The method of any one of the preceding embodiments, further comprising: the cut-off score is between 95 and 99 percent of the amount of information in the semantic graph.

A18. A tangible, non-transitory, machine-readable medium storing instructions that, when executed by a data processing apparatus, cause the data processing apparatus to perform operations comprising those of any of embodiments A1-A17.

A19. A system comprising one or more processors; and memory storing instructions that, when executed by the processors, cause the processors to effectuate operations comprising those of any of embodiments A1-A17.

A20. A system comprising means for performing any of embodiments A1-A17.

The present techniques for improving label quality in datasets using a quality filter based on a consistency score will be better understood with reference to the following enumerated embodiments:

B1. A method, the method comprising: receive a first given label for a first text string, process the first text string in the artificial intelligence model, determine a first predicted label for the first text string, determine a first consistency score for the first text string based on a comparison of the first predicted label and the first given label, wherein the first consistency score indicates a measure of agreement between predicted labels, compare the first consistency score to a first threshold consistency score, in response to comparing the first consistency score to the first threshold consistency score, filter the first text string to a first group; and generate for display, on a user interface, a recommendation to use the first group as a training sample for a supervised learning task.

B2. A method, the method comprising: receiving a first given label for a first text string; processing the first text string in an artificial intelligence model, wherein the artificial intelligence model is trained to output predicted labels given inputted text strings; determining a first predicted label for the first text string; determining a first consistency score for the first text string based on a comparison of the first predicted label and the first given label, wherein the first consistency score indicates a degree of consensus between the first predicted label and the first given label; comparing the first consistency score to a first threshold consistency score; in response to comparing the first consistency score to the first threshold consistency score, filtering the first text string to a first group; and generating for display, on a user interface, a recommendation to use the first group as a training sample for a supervised learning task.

B3. The method of any one of the preceding embodiments, further comprising: determining a first datapoint by embedding the first text string in a semantic graph using a language model; receiving a second label for a second text string; embedding the second text string in the semantic graph using the language model, wherein the second text string is represented by a second datapoint; determining a distance between the first datapoint and the second datapoint; and determining the first predicted label based in part on the distance.

B4. The method of any one of the preceding embodiments, further comprising: processing the first text string in a first machine learning model trained to predict labels for text string inputs, wherein the first machine learning model has been trained separately from the artificial intelligence model; and determining a first given label for the first text string.

B5. The method of any one of the preceding embodiments, further comprising: receiving a first user input; and determining a first given label for the first text string based on the first user input.

B6. The method of any one of the preceding embodiments, further comprising: in response to comparing the first consistency score to the first threshold consistency score, filtering the first text string to a second group; and generating for display, on a user interface, a recommendation to assign a second given label to the first text string.

B7. The method of any one of the preceding embodiments, further comprising: receiving a second given label for the first text string; and determining a second consistency score for the first text string based on a comparison of the first predicted label and the second given label.

B8. The method of any one of the preceding embodiments, further comprising: the second consistency score for the first text string is based on a comparison of the first predicted label, the first given label, and the second given label.

B9. The method of any one of the preceding embodiments, further comprising: the first predicted label comprises a first probability distribution having a first set of possible labels with first likelihoods, and wherein the first given label comprises a second probability distribution having a second set of possible labels with second likelihoods.

B10. The method of any one of the preceding embodiments, further comprising: determining a first measure of center and a first variance metric from the first probability distribution; determining a second measure of center and a second variance metric from the second probability distribution; and determining the degree of consensus based on a comparison of the first measure of center with the second measure of center, combined with a comparison of the first variance metric with the second variance metric.

B11. The method of any one of the preceding embodiments, further comprising: determining an intersection between the first probability distribution and the second probability distribution, wherein the intersection comprises a set of possible labels shared by the first probability distribution and the second probability distribution; and determining the degree of consensus based on a cardinality of the intersection, wherein the degree of consensus increases along with a number of possible labels shared by the first probability distribution and the second probability distribution.

B12. The method of any one of the preceding embodiments, further comprising: comparing the first set of possible labels with the second set of possible labels; in response to comparing the first set of possible labels with the second set of possible labels, determining a set of shared labels; and determining a divergence between the first probability distribution and the second probability distribution, based on a comparison of the first likelihoods with the second likelihoods in the set of shared labels.

B13. The method of any one of the preceding embodiments, further comprising: determining an edit distance between the first hard label and the second hard label, wherein the edit distance comprises a measure of single-character edits needed to change the first hard label into the second hard label; and determining the degree of consensus based on the edit distance.

B14. The method of any one of the preceding embodiments, further comprising: determining a composite likelihood from the first likelihood and the second likelihood; determining a first entropy score from the composite likelihood, wherein the first entropy score indicates randomness of label components in the composite likelihood; comparing the first entropy score to a first threshold entropy score; and in response to comparing the first entropy score to the first threshold entropy score, generating for display, on a user interface, a recommendation to review the first predicted label.

B15. The method of any one of the preceding embodiments, further comprising: determining a first outlier score based on the distance; comparing the first outlier score to a first threshold outlier score; and selecting a recommendation from a plurality of recommendations based on comparing the first outlier score to a first threshold outlier score.

B16. The method of any one of the preceding embodiments, further comprising: determining an optimal set of dimensions based on the semantic graph; determining a projected graph by projecting the semantic graph into the optimal set of dimensions; selecting a first projection from the projected graph, wherein the first projection corresponds to the first datapoint in the semantic graph; selecting a second projection from the projected graph, wherein the second projection corresponds to the second datapoint in the semantic graph; determining a projected distance between the first projection and the second projection; and determining the first predicted label based in part on the projected distance between the first projection and the second projection.

B17. The method of any one of the preceding embodiments, further comprising: determining an amount of information present in the semantic graph, wherein the amount of information is unevenly distributed among the original dimensions; determining a first optimal dimension from the original dimensions, wherein the first optimal dimension has a first amount of information, and wherein the first amount of information comprises a portion of the amount of information present in the semantic graph; comparing the first amount of information to a cut-off score; and in response to comparing the first amount of information to the cut-off score, including the first optimal dimension in the optimal set of dimensions.

B18. A tangible, non-transitory, machine-readable medium storing instructions that, when executed by a data processing apparatus, cause the data processing apparatus to perform operations comprising those of any of embodiments B1-B17.

B19. A system comprising one or more processors; and memory storing instructions that, when executed by the processors, cause the processors to effectuate operations comprising those of any of embodiments B1-B17.

B20. A system comprising means for performing any of embodiments B1-B17.

The present techniques for improving training efficiency while reducing total labeling cost for downstream modeling using entropy scores for labeling predictions will be better understood with reference to the following enumerated embodiments:

C1. A method, the method comprising: receive a first text string, process the first text string in the artificial intelligence model, determine a first likelihood that the first text string has a first label component, determine a second likelihood that the first text string has a second label component, determine a composite likelihood for the first text string based on the first likelihood and the second likelihood, determine a first entropy score from the composite likelihood, wherein the first entropy score indicates randomness of label components in the composite likelihood, compare the first entropy score to a first threshold entropy score; and generate for display, on a user interface, a recommendation to review a first label being assigned to the first text string in response to comparing the first entropy score to the first threshold entropy score.

C2. A method, the method comprising: receiving a first text string; processing the first text string in an artificial intelligence model, wherein the artificial intelligence model is trained to output likelihoods that inputted text strings correspond to predetermined labels; determining a first likelihood that the first text string has a first label component; determining a second likelihood that the first text string has a second label component; determining a composite likelihood for the first text string based on the first likelihood and the second likelihood; determining a first entropy score from the composite likelihood, wherein the first entropy score indicates uncertainty of label components in the composite likelihood; comparing the first entropy score to a first threshold entropy score; and in response to comparing the first entropy score to the first threshold entropy score, generating for display, on a user interface, a recommendation to review a first label being assigned to the first text string.

C3. The method of any one of the preceding embodiments, further comprising: recording a first natural language utterance; and decoding the first natural language utterance into the first text string.

C4. The method of any one of the preceding embodiments, further comprising: generating the recommendation to review the first label being assigned further comprises simultaneously generating an option to assign the first label or a second label.

C5. The method of any one of the preceding embodiments, further comprising: the first label being assigned is the first label, and generating the recommendation to review the first label further comprises: assigning the first label to the first text string; and evaluating the first label and the first text string as a test sample against a machine learning model trained on similar text and label data, wherein the machine learning model has been trained separately from the artificial intelligence model.

C6. The method of any one of the preceding embodiments, further comprising: receiving a third user input; and determining a hard label for the first label component based on the third user input.

C7. The method of any one of the preceding embodiments, further comprising: receiving a likelihood from the artificial intelligence model; and determining a soft label for the first label component based on the likelihood.

C8. The method of any one of the preceding embodiments, further comprising: determining a projected improvement to the artificial intelligence model given a ground truth label is provided to the artificial intelligence model for the first text string; and determining a value of assigning the ground truth label to the first text string based on the projected improvement.

C9. The method of any one of the preceding embodiments, further comprising: embedding the first text string in a semantic graph using a language model, wherein the first text string is represented by a first datapoint; receiving a second text string; embedding the second text string in the semantic graph using the language model, wherein the second text string is represented by a second datapoint; processing the second datapoint in the artificial intelligence model, wherein the artificial intelligence model also accepts datapoints as inputs; determining the second datapoint has an estimated label based on a likelihood output from the artificial intelligence model; determining a distance between the first datapoint and the second datapoint; and determining the first likelihood that the first datapoint also has the estimated label from the second datapoint based in part on the distance between the datapoints.

C10. The method of any one of the preceding embodiments, further comprising: processing the first datapoint in a machine learning model trained to predict labels for datapoint inputs, wherein the machine learning model has been trained separately from the artificial intelligence model; and determining a label prediction for the first datapoint.

C11. The method of any one of the preceding embodiments, further comprising: determining a first outlier score based on the distance; comparing the first outlier score to a first threshold outlier score; and selecting a recommendation from a plurality of recommendations based on comparing the first outlier score to a first threshold outlier score.

C12. The method of any one of the preceding embodiments, further comprising: the second text string has a second entropy score and a second outlier score, and wherein the method further comprises: determining an average entropy from the first entropy score and the second entropy score; determining an average outlier from the first outlier score and the second outlier score; and determining the first threshold outlier score from the average outlier and the first threshold entropy score from the average entropy.

C13. The method of any one of the preceding embodiments, further comprising: receiving a first user input; determining a first set value for the first threshold entropy score based on the first user input; receiving a second user input; and determining a second set value for the first threshold outlier score based on the second user input.

C14. The method of any one of the preceding embodiments, further comprising: the composite likelihood comprises a joint probability distribution.

C15. The method of any one of the preceding embodiments, further comprising: determining an optimal set of dimensions based on the semantic graph; determining a projected graph by projecting the semantic graph into the optimal set of dimensions; selecting a first projection from the projected graph, wherein the first projection corresponds to the first datapoint in the semantic graph; selecting a second projection from the projected graph, wherein the second projection corresponds to the second datapoint in the semantic graph, and wherein the second projection also has the estimated label from the second datapoint; determining a projected distance between the first projection and the second projection; and determining the first likelihood that the first projection also has the estimated label from the second projection based in part on the projected distance.

C16. The method of any one of the preceding embodiments, further comprising: determining a first predicted label for the first projection; determining a first consistency score for the first projection based on a comparison of the first predicted label and the first label, wherein the first consistency score indicates a degree of consensus between the first predicted label and the first label; comparing the first consistency score to a first threshold consistency score; in response to comparing the first consistency score to the first threshold consistency score, filtering the first projection to a first group; and generating for display, on a user interface, a recommendation to use the first group as a training sample for a supervised learning task.

C17. The method of any one of the preceding embodiments, further comprising: the semantic graph has original dimensions, and wherein determining the optimal set of dimensions further comprises: determining an amount of information present in the semantic graph, wherein the amount of information is unevenly distributed among the original dimensions; determining a first optimal dimension from the original dimensions, wherein the first optimal dimension has a first amount of information, and wherein the first amount of information comprises a portion of the amount of information present in the semantic graph; comparing the first amount of information to a cut-off score; and in response to comparing the first amount of information to the cut-off score, including the first optimal dimension in the optimal set of dimensions.

C18. A tangible, non-transitory, machine-readable medium storing instructions that, when executed by a data processing apparatus, cause the data processing apparatus to perform operations comprising those of any of embodiments C1-C17.

C19. A system comprising one or more processors; and memory storing instructions that, when executed by the processors, cause the processors to effectuate operations comprising those of any of embodiments C1-C17.

C20. A system comprising means for performing any of embodiments C1-C17.

What is claimed is:

1. A system for optimizing data labeling based on entropy scores, the system comprising:
cloud-based storage circuitry configured to store an artificial intelligence model trained to output likelihoods that inputted text strings correspond to predetermined labels,
cloud-based control circuitry configured to:
receive a text string;
process the text string using the artificial intelligence model to identify a first predetermined label and a second predetermined label as options for a label to assign to the text string;
determine a first likelihood that the text string corresponds to the first predetermined label;
determine a second likelihood that the text string corresponds to the second predetermined label;
determine a composite likelihood for the text string based on the first likelihood and the second likelihood,
determine an entropy score from the composite likelihood indicating a measure of uncertainty of the artificial intelligence model in selecting, as the label for the text string, the first predetermined label or the second predetermined label;
based on the entropy score exceeding a threshold entropy score indicating that additional labeling is to be performed for the text string, performing the additional labeling to the text string; and
assigning, based on the additional labeling, the first predetermined label to the text string; and
cloud-based input/output circuitry configured to:
generate, for display on a user interface, a recommendation to assign the first predetermined label to the text string, wherein responsive to the recommendation being approved, the first predetermined label is assigned as the label for the text string.

2. A method comprising:
receiving a first text string;
processing the first text string using an artificial intelligence model trained to output likelihoods that inputted text strings correspond to predetermined labels;
determining a first likelihood that the first text string corresponds to a first predetermined label predicted by the artificial intelligence model for the first text string;
determining a second likelihood that the first text string corresponds to a second predetermined label predicted by the artificial intelligence model for the first text string;
determining a composite likelihood for the first text string based on the first likelihood and the second likelihood;
determining a first entropy score from the composite likelihood indicating a measure of uncertainty of the artificial intelligence model in selecting, as a label for the first text string, the first predetermined label or the second predetermined label;
causing, based on the first entropy score exceeding a threshold entropy score, additional labeling to be performed to the first text string; and
assigning, based on the additional labeling, the first predetermined label to the first text string.

3. The method of claim 2, wherein receiving the first text string further comprises:
recording a natural language utterance; and
decoding the natural language utterance into the first text string.

4. The method of claim 2, wherein assigning the first predetermined label further comprises:
generating for display, on a user interface, a recommendation to review the first predetermined label being assigned to the first text string; and
simultaneously generating an option to assign the first predetermined label or a second predetermined label, wherein the first predetermined label is assigned based on the option being selected.

5. The method of claim 2, wherein assigning the first predetermined label comprises:
evaluating the first predetermined label and the first text string as a test sample against a machine learning model trained on similar text and label data and that has been trained separately from the artificial intelligence model.

6. The method of claim 2, further comprising:
receiving a user input; and determining a hard label for the first predetermined label based on the user input.

7. The method of claim 2, further comprising:
receiving a likelihood from the artificial intelligence model; and
determining a soft label for the first predetermined label based on the likelihood.

8. The method of claim 2, wherein determining the first entropy score further comprises:
determining a projected improvement to the artificial intelligence model based on a ground truth label provided to the artificial intelligence model for the first text string; and
determining a value of assigning the ground truth label to the first text string based on the projected improvement.

9. The method of claim 2, wherein determining the composite likelihood comprises:
embedding the first text string represented by a first datapoint in a semantic graph using a language model;
receiving a second text string;
embedding the second text string represented by a second datapoint in the semantic graph using the language model;
processing the second datapoint in the artificial intelligence model, wherein the artificial intelligence model also accepts datapoints as inputs;
determining the second datapoint has an estimated label based on a likelihood output from the artificial intelligence model;
determining a distance between the first datapoint and the second datapoint; and
determining a likelihood that the first datapoint also has the estimated label from the second datapoint based in part on the distance between the datapoints.

10. The method of claim 9, further comprising:
processing the first datapoint in a machine learning model trained to predict labels for datapoint inputs and that has been trained separately from the artificial intelligence model; and
determining a label prediction for the first datapoint.

11. The method of claim 9, further comprising:
determining a first outlier score based on the distance;
comparing the first outlier score to a threshold outlier score; and
selecting a recommendation from a plurality of recommendations based on comparing the first outlier score to the threshold outlier score.

12. The method of claim 11, wherein the second text string has a second entropy score and a second outlier score, and wherein the method further comprises:
determining an average entropy from the first entropy score and the second entropy score;
determining an average outlier from the first outlier score and the second outlier score; and
determining the threshold outlier score from the average outlier and the threshold entropy score from the average entropy.

13. The method of claim 11, wherein determining the threshold entropy score further comprises:
receiving a first user input;
determining a first set value for the threshold entropy score based on the first user input;
receiving a second user input; and
determining a second set value for the threshold outlier score based on the second user input.

14. The method of claim 2, wherein the composite likelihood comprises a joint probability distribution.

15. The method of claim 9, further comprising:
determining an optimal set of dimensions based on the semantic graph;
determining a projected graph by projecting the semantic graph into the optimal set of dimensions;
selecting a first projection from the projected graph corresponding to the first datapoint in the semantic graph;
selecting a second projection from the projected graph corresponding to the second datapoint in the semantic graph and comprising the estimated label from the second datapoint;
determining a projected distance between the first projection and the second projection; and
determining a projected likelihood that the first projection also has the estimated label from the second projection based in part on the projected distance.

16. The method of claim 15, further comprising:
determining a predicted label for the first projection;
determining a consistency score for the first projection based on a comparison of the predicted label and the first predetermined label, wherein the consistency score indicates a degree of consensus between the predicted label and the first predetermined label;
causing, based on, comparing the consistency score to a threshold consistency score the first projection to be filtered to a group; and
generating for display, on a user interface, a recommendation to use the group as a training sample for a supervised learning task.

17. The method of claim 15, wherein the semantic graph has original dimensions, and wherein determining the optimal set of dimensions further comprises:
determining a first amount of information present in the semantic graph that is unevenly distributed among the original dimensions;
determining a optimal dimension from the original dimensions having a second amount of information comprising a portion of the first amount of information; and
causing, based on comparing the second amount of information to a cut-off score, the optimal dimension to be included in the optimal set of dimensions.

18. One or more non-transitory, computer-readable media comprising instructions that, when executed by one or more processors, causes operations comprising:
in response to receiving a text string, processing the text string using an artificial intelligence model to obtain a first likelihood that a first predetermined label is to be assigned to the text string and a second likelihood that a second predetermined label is to be assigned to the text string;
determining a composite likelihood for the text string based on the first likelihood and the second likelihood;
determining, based on the composite likelihood, an entropy score indicating an amount of uncertainty the artificial intelligence model has in selecting the first predetermined label or the second predetermined label for the text string;
in response to the entropy score exceeding a threshold entropy score, causing additional labeling to be performed to the text string; and
assigning, based on the additional labeling, the first predetermined label to the text string.

19. The one or more non-transitory, computer-readable media of claim 18, wherein assigning the first predetermined label further comprises:
evaluating the first predetermined label and the text string as a test sample against a machine learning model trained on similar text and label data and that has been trained separately from the artificial intelligence model.

20. The one or more non-transitory, computer-readable media of claim 18, wherein determining the entropy score further comprises:
- determining a projected improvement to the artificial intelligence model given a ground truth label is provided to the artificial intelligence model for the text string; and
- determining a value of assigning the ground truth label to the text string based on the projected improvement.

* * * * *